United States Patent
Hetzer et al.

(10) Patent No.: US 10,602,722 B1
(45) Date of Patent: Mar. 31, 2020

(54) SMART LEASH SYSTEM

(71) Applicant: HETZER DESIGN AND INNOVATIONS LLC, Fishers, IN (US)

(72) Inventors: Joseph Mathew Hetzer, Fishers, IN (US); Anthony Clarence Hetzer, Cincinnati, OH (US); Zhen Huang, Carmel, IN (US)

(73) Assignee: HETZER DESIGN AND INNOVATIONS LLC, Fishers, IN (US)

(*) Notice: Subject to any disclaimer, the term of this patent is extended or adjusted under 35 U.S.C. 154(b) by 0 days.

(21) Appl. No.: 16/592,710

(22) Filed: Oct. 3, 2019

Related U.S. Application Data

(60) Provisional application No. 62/814,613, filed on Mar. 6, 2019.

(51) Int. Cl.
 *A01K 15/04* (2006.01)
 *A01K 27/00* (2006.01)

(52) U.S. Cl.
 CPC .......... *A01K 27/009* (2013.01); *A01K 27/001* (2013.01); *A01K 27/003* (2013.01)

(58) Field of Classification Search
 CPC .... A01K 27/00; A01K 27/001; A01K 27/003; A01K 27/004; A01K 27/009
 USPC .......... 119/712, 769, 792, 856, 859
 See application file for complete search history.

(56) References Cited

U.S. PATENT DOCUMENTS

| | | | |
|---|---|---|---|
| 5,494,002 A | 2/1996 | Greene | |
| 5,815,077 A | 9/1998 | Christiansen | |
| 6,003,474 A * | 12/1999 | Slater | A01K 27/009 119/859 |
| 6,612,264 B2 | 9/2003 | Levine | |
| 6,830,014 B1 * | 12/2004 | Lalor | A01K 27/009 119/720 |
| 8,402,924 B2 * | 3/2013 | Pacheco | A01K 27/009 119/712 |
| 8,763,563 B2 * | 7/2014 | Thalmann | A01K 15/029 119/792 |
| 9,943,066 B2 | 4/2018 | Zhao et al. | |
| 2015/0359197 A1 * | 12/2015 | Crucs | A01K 27/004 119/719 |
| 2016/0157466 A1 * | 6/2016 | Gunn | A01K 27/006 119/797 |
| 2016/0302386 A1 | 10/2016 | Zhao et al. | |

FOREIGN PATENT DOCUMENTS

WO WO-2010010006 A1 * 1/2010 ........... A01K 27/005

\* cited by examiner

*Primary Examiner* — Peter M Poon
*Assistant Examiner* — Danielle A Clerkley
(74) *Attorney, Agent, or Firm* — Piroozi-IP, LLC

(57) ABSTRACT

A smart leash system is disclosed, which includes a handheld system configured to be held by a user, a collar system configured to be worn by an animal, a leash coupled to and extended between the handheld system and the collar system, and a load measuring sensor coupled to the handheld system and configured to measure force applied to the leash, wherein one of the handheld system, the collar system, and both the handheld system and the collar system is configured to receive a force signal representing the force applied to the leash and signal the collar system to provide a feedback to the animal when the force exceeds a predetermined threshold.

18 Claims, 7 Drawing Sheets

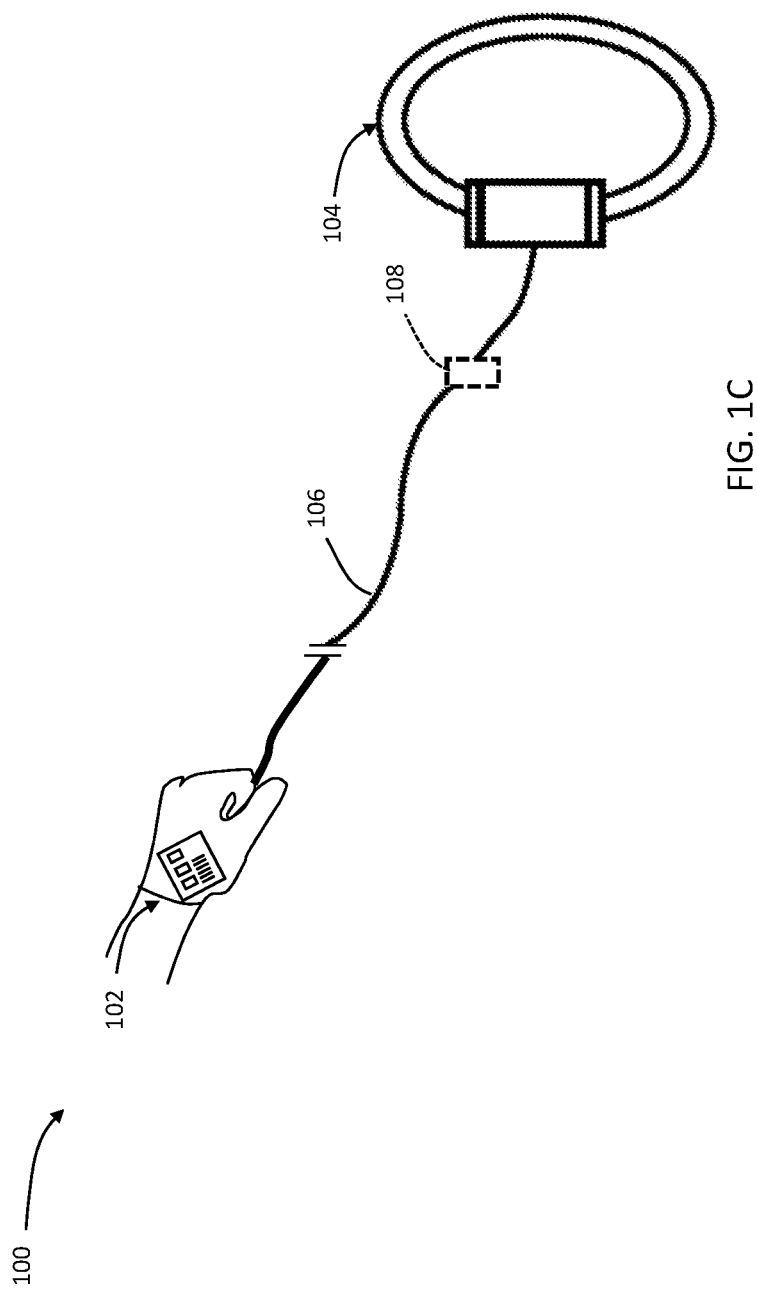

SMART LEASH SYSTEM

CROSS-REFERENCE TO RELATED APPLICATIONS

The present patent application is related to and claims the priority benefit of U.S. Provisional Patent Application Ser. No. 62/814,613 filed Mar. 6, 2019, the contents of which are hereby incorporated by reference in its entirety into the present disclosure.

STATEMENT REGARDING GOVERNMENT FUNDING

This invention was not made with government.

TECHNICAL FIELD

The present disclosure generally relates to devices for animal behavior control, and in particular, to a smart leash that can be used for that purpose.

BACKGROUND

This section introduces aspects that may help facilitate a better understanding of the disclosure. Accordingly, these statements are to be read in this light and are not to be understood as admissions about what is or is not prior art.

Animal leashes are ubiquitous. Many local ordinances require animals to be on leashes when in public. However, many animals, particularly dogs, can be distracted by events occurring around them and behave in a manner that places the animal on leash, the walker of the animal, other animals, and other individuals at risk.

A popular type of leash is a retractable leash that allows a walker of the animal to control the separation distance between the walker and the animal on leash. However, for a large animal, a walker may have difficulty controlling the animal, even when the retractable leash is placed on a short setting (i.e., a short leash).

In a typical situation, the animal may see something of interest and begins to move towards the object of interest and in doing so exert a force onto the leash which is held by the walker of the animal and for first order approximation is assumed to be stationary or traveling at a constant speed. That object may be another animal. The animal on the retractable leash or other types of leashes available in the industry continues to exert a force, until such force causes an annoyance for the walker. The force applied to the walker results in an equal and opposite force to the animal on the leash. Such a force if singular or repetitive, could not only cause injury to the walker but also to the animal on the leash. If the walker is unable to absorb the force, the walker may fall or simply let go of the leash, both situations can result in immediate injury to the walker, or an injury to others (humans or other animals) when the animal on leash is no longer controlled by its walker. Another type of arrangement is the so called pinch-collar which includes dull spikes that press on the animal's neck and throat. These types of leashes while could result in a smaller force being applied by the animal due to the uncomfortable pinch provided by the collar, often result in the animal ignoring the pinch and continue to apply excessive force.

The aforementioned equal and opposite force on the animal does not provide an effective apriori feedback to the animal on leash. It is a reactive feedback rather that a preventative feedback. That is, the force provides a feedback only after the animal on leash has committed to the full exertion of the force rather than providing a feedback prior to such full exertion. Thus the animal on leash has no opportunity to correct its behavior.

Unfortunately, prior art leashes are all based on such reactive feedback and lack the capabilities to afford the animal on leash to correct its behavior.

Therefore, there is an unmet need for a novel approach for an animal behavior control device that allows a person to walk or run with an animal on leash and which provides selective and programmable feedback to the animal.

SUMMARY

A smart leash system is disclosed. The system includes a handheld system configured to be held by a user. The system also includes a collar system configured to be worn by an animal. In addition, the system includes a leash coupled to and extended between the handheld system and the collar system. Furthermore, the system includes a load measuring sensor coupled to the handheld system and configured to measure force applied to the leash. One of the handheld system, the collar system, and both the handheld system and the collar system is configured to receive a force signal representing the force applied to the leash and signal the collar system to provide a feedback to the animal when the force exceeds a predetermined threshold.

A method of providing training feedback to an animal is also disclosed. The method includes placing a smart leash system (SLS) on an animal. The SLS includes a collar system configured to be worn by an animal, a leash, a handheld system held by a user, and a load measuring sensor coupled to the handheld system and adapted to provide a force signal proportional to a force placed on the leash. The method also includes receiving the force signal by one of the handheld system, the collar system, and both the handheld system and the collar system, the signal representing a force applied to the leash. The method further includes providing a feedback to the animal when the signal representing the force exceeds a predetermined threshold.

BRIEF DESCRIPTION OF DRAWINGS

FIG. 1C is a schematic view of the SLS of FIG. 1A showing a handheld system, a leash, and a collar system.

DETAILED DESCRIPTION

Figure 1A:
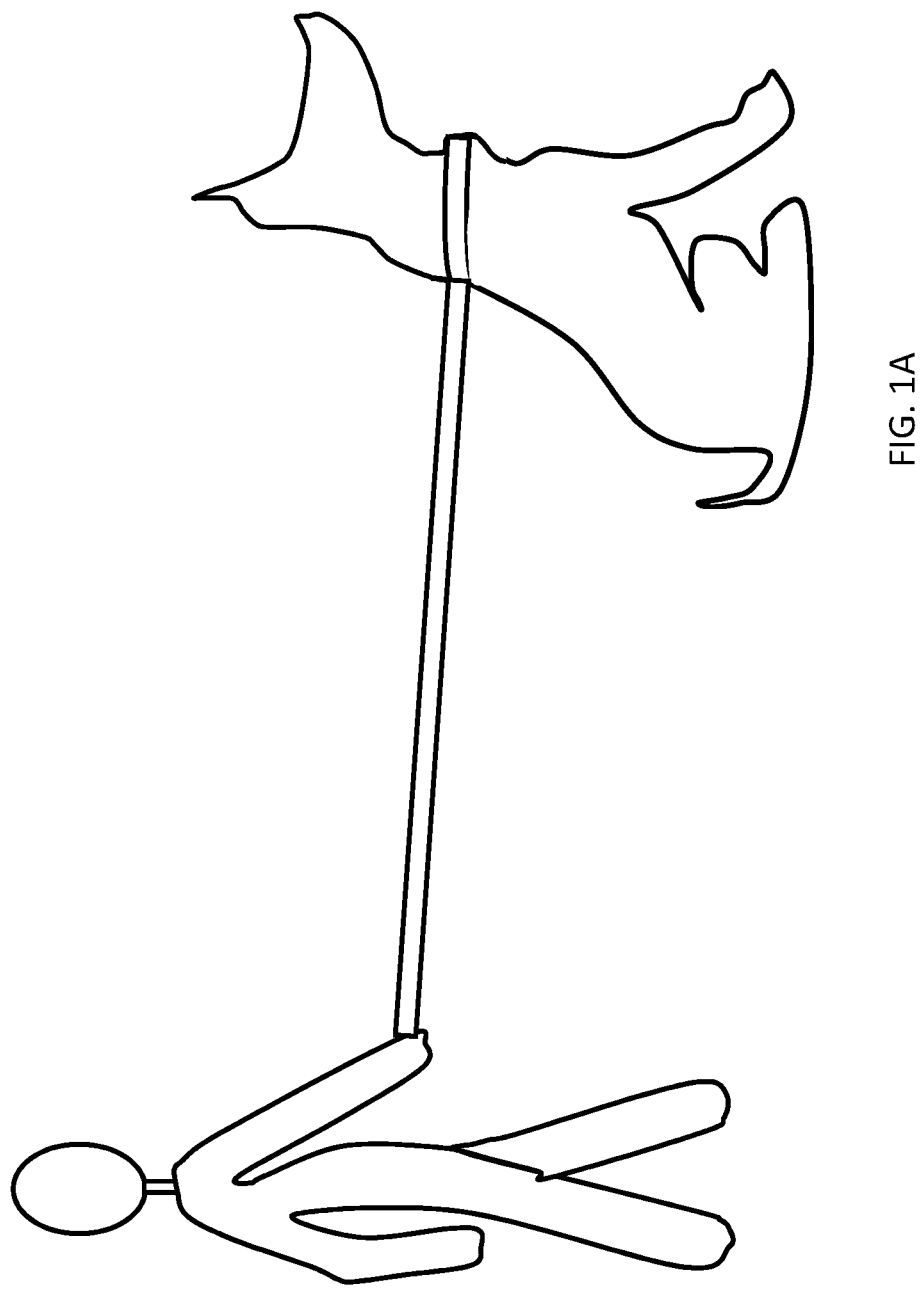
FIG. 1A is schematic of a person walking an animal using a smart leash system (SLS) of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

Figure 1B:
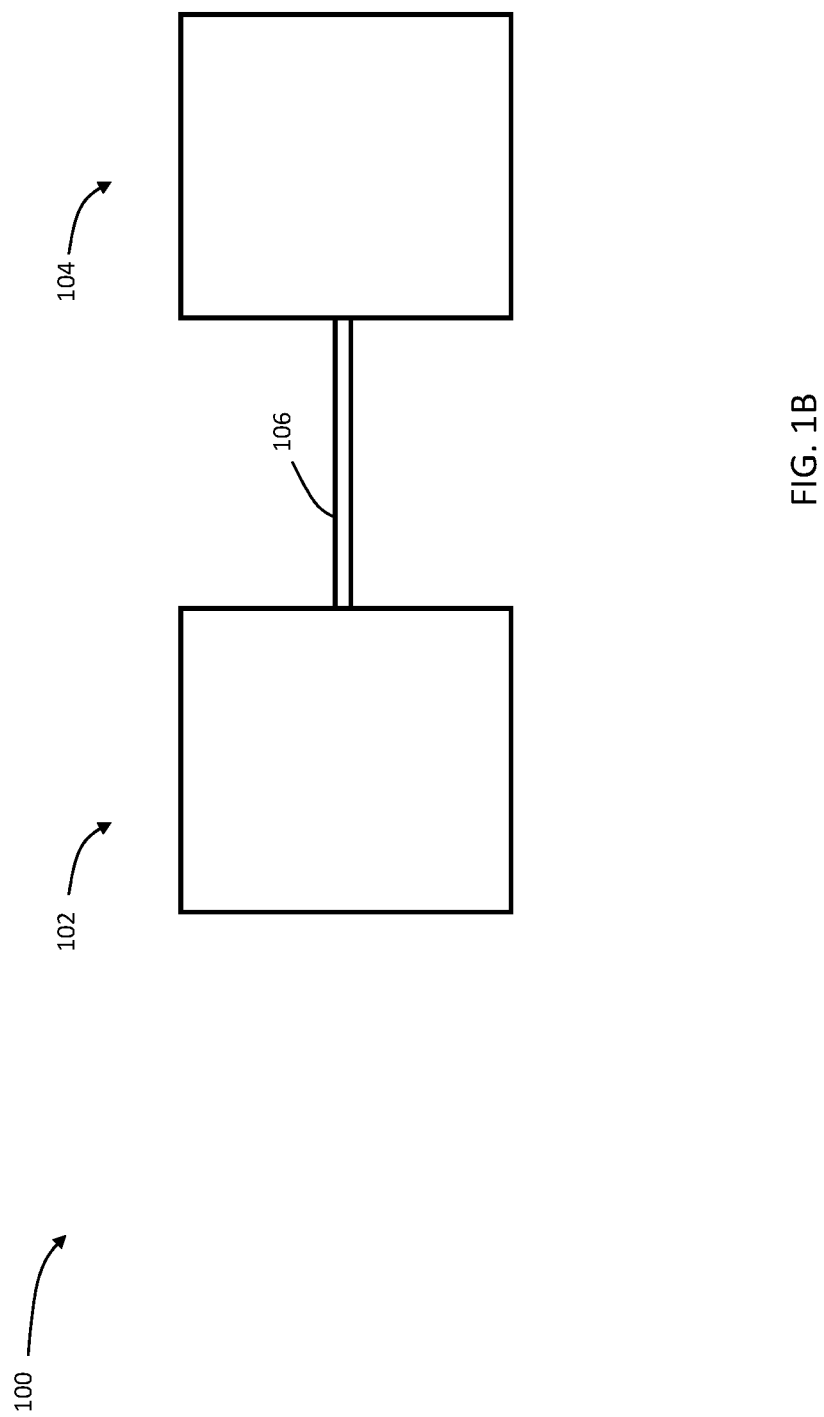
FIG. 1B is a block diagram of the SLS of FIG. 1A.

A novel approach for an animal behavior control device is provided in the present disclosure that allows a person to walk or run with an animal on leash and which provides selective and programmable feedback to the animal after the animal has reached a full extension of the leash and based on thresholds of force signals. The feedback allows the animal on leash to correct its behavior prior to reaching an unacceptable level of force placed on the leash. Referring to FIG. 1A, a schematic of the animal, the walker, and the leash is provided. A block diagram of the same is also provided in FIG. 1B. Referring to FIG. 1B, a smart leash system 100 is shown including a handheld system 102 and a collar system 104. The handheld system 102 is coupled to the collar system 104 by a smart leash collar 106. The handheld system 102 is in electronic communication (wired, wireless, or a combination of wired and wireless) with the collar system 104. In the case of wireless, the handheld system 102 is adapted to use a plurality of wireless schemes, e.g., Wi-Fi, Wi-Fi P2P, Zigbee, Z wave, Thread, Bluetooth, dedicated RF, IPv6 over low power wireless Personal Area Networks, GPRS/2G/3G/4G/LTE, near-field communication, SigFox, and other wireless protocols known to a person having ordinary skill in the art. In the case of wired, the handheld system 102 is adapted to use a plurality of wired schemes, including serial and parallel communication schemes. These include I²C, SPI, ethernet, RS-232, RS-485, UART, USART, USB, CAN and other wired communication schemes known to a person having ordinary skill in the art.

Referring to FIG. 1C, another schematic of the smart leash system 100 is shown. The smart leash system 100 according to FIG. 1C, again includes to the handheld system 102, the collar system 104, and the smart leash 106. Optionally on the smart leash 106 there is a tension load sensor 108 in line with the smart leash 106. This tension load sensor 108 can be provided as part of the smart leash 106, as part of the collar system 104, or as part of the handheld system 102, hence it is shown in phantom lines to indicate it is optionally provided on the smart leash 106 according to the embodiment shown in FIG. 1C.

Figure 2:
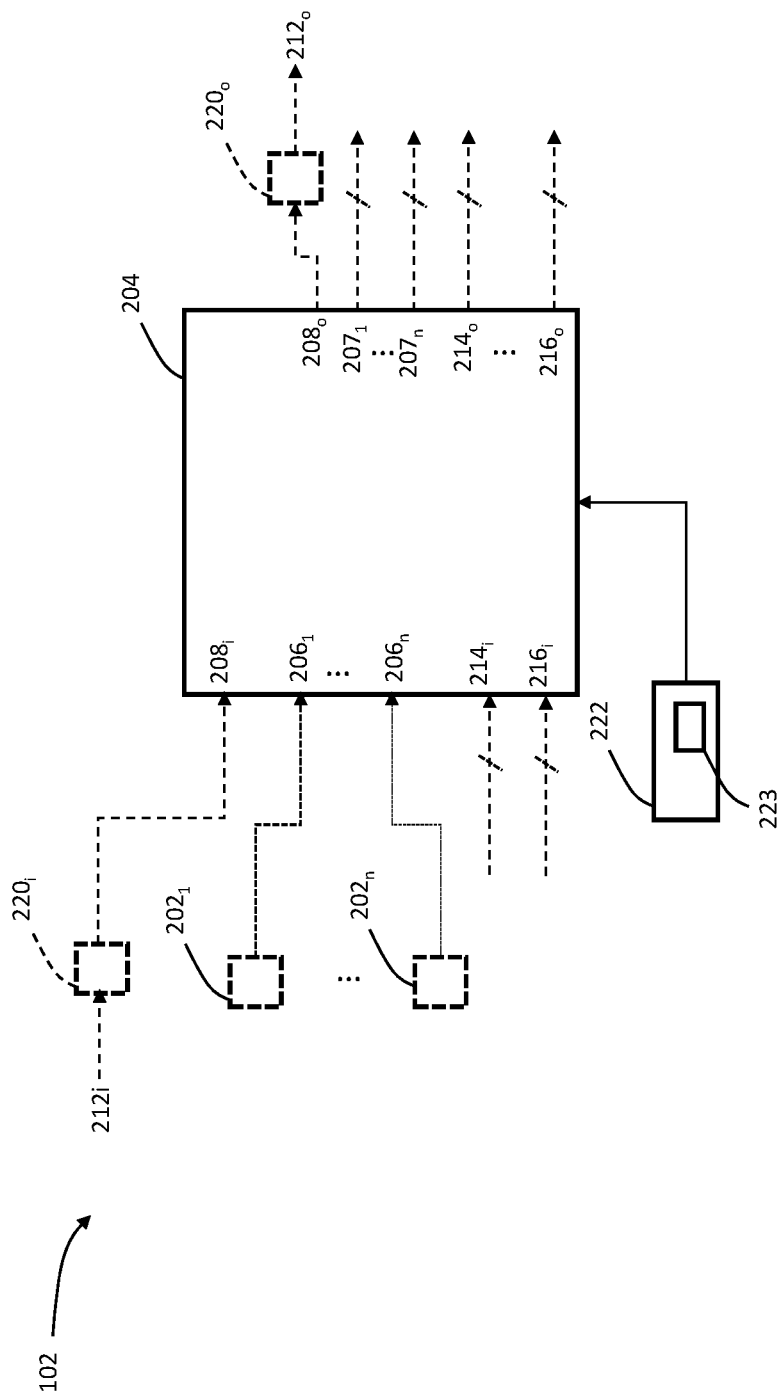
FIG. 2 is a block diagram of the handheld system shown in FIG. 1C.

The handheld system 102 is shown as a block diagram in FIG. 2, according to one embodiment of the present disclosure. The handheld system 102 includes a plurality of manual inputs $202_1, \ldots, 202_n$ each electrically coupled to a processor 204 at a corresponding manual input pin $206_1, \ldots 206_n$ via an optional conditioning circuit (not shown) adaptable to convert the corresponding signals to appropriate levels for the processor 204. The processor 204 can be an off the shelf processor, e.g., ARM processors, which require supporting components, e.g., memory; or the processor 204 can be a microcontroller, e.g., different microcontrollers from Microchip with integrated components; or the processor can be a field programmable gate array (FPGA) mounted and operated on a board. Depending on the type of processor/microcontroller/FPGA used, these manual inputs ($202_1, \ldots, 202_n$) and their corresponding manual input pins ($206_1, \ldots 206_n$) may be multiplexed by a multiplexer (not shown) as known to a person having ordinary skill in the art.

The handheld system 102 may also include a plurality of manual outputs each electrically coupled to the processor 204 at a corresponding manual input pin $207_1, \ldots 207_n$. There may be optional conditioning circuits (not shown) adaptable to convert the corresponding signals to appropriate levels from the processor 204.

The processor 204 may also include a wireless communication pin $208_i$ coupled to an external wireless input module $220_i$ that is coupled to an input pin $212_i$, e.g., an antenna. The wireless input module $220_i$ may alternatively be integrated into the processor 204. The processor 204 may optionally have a wireless communication output pin $208_o$, coupled to an external wireless output module $220_o$ that is coupled to an output pin $212_o$, e.g., an antenna. The wireless output module $220_o$ may alternatively be integrated into the processor 204.

The processor 204 may also include input wired communication input buses. According to one embodiment, pins $214_i$ and $214_o$ are adapted to provide parallel communication bus input and output, accordingly. Similarly, according to another embodiment, pins $216_i$ and $216_o$ are adapted to provide serial communication bus input and output, accordingly. The handheld system 102 also includes a power source a corresponding voltage regulation circuit (power block) 222 coupled to the processor 204. The power block 222 includes a power source 223, e.g., a battery that according to one embodiment can be a rechargeable battery, and down converting circuitry adapted to provide appropriate voltage and current for use by the processor 204.

Figure 3:
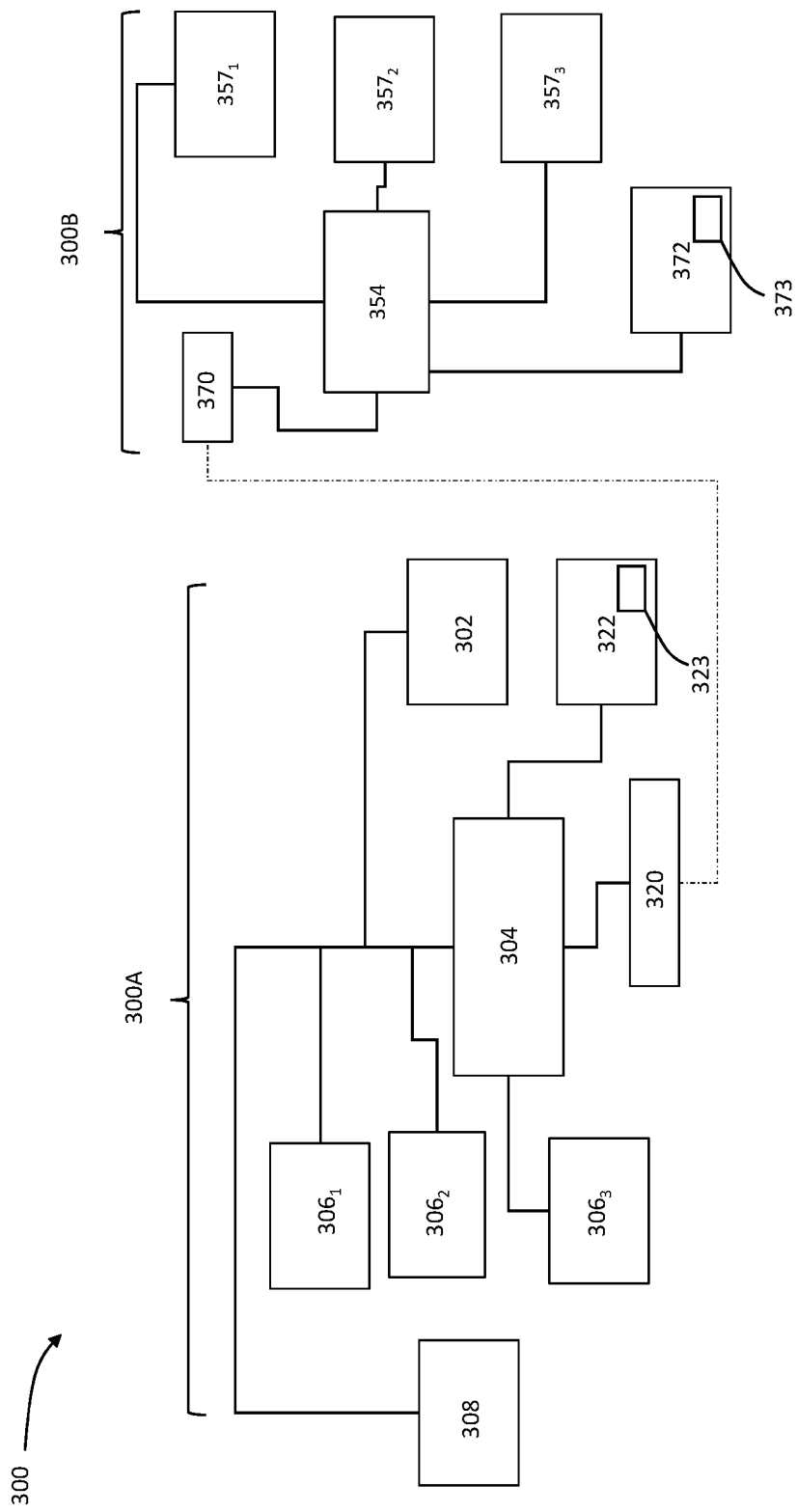
FIG. 3 is a block diagram of the SLS of FIG. 1A in greater detail.

Referring to FIG. 3, an embodiment of a smart leash system 300 according to the present disclosure is provided. The smart leash system 300, includes two portions coupled via a communication link. The first portion represents a handheld system 300A (see the handheld system 102 of FIG. 1C). The second portion represents the smart collar system 300B (see the smart collar system 104 of FIG. 1C). The handheld system 300A includes a first processor 304 coupled to an auxiliary manual input 302, manual inputs including manual electrical stimulation input 3061, manual vibrate stimulation input 3062, and manual audible stimulation input 3063. The first processor 304 is also coupled to the tension load sensor 308. As discussed above, the tension load sensor 308 may be optionally provided on the smart collar system 303B, the handheld system 300A, or the smart leash 106 (see FIG. 1C).

The first processor 304 obtains its power from a power block 322. In most cases, the power block 322 includes a battery 323, e.g., a rechargeable battery, and the accompanying circuit to condition the power for use by the processor 304.

The coupling between the handheld system 300A, and in particular between the wireless communication module 320 and the smart collar system 300B is i) wireless, ii) wired, or iii) a combination of wired and wireless. A list of potential protocols for both wired and wireless communications between the two systems is provided above.

The smart collar system 300B includes a second processor 354, which is coupled to the wireless communication module 370 and which is adapted to establish wireless communication between the first processor 304 and the second processor 354. The second processor 354 is also coupled to the power block 372. In most cases, the power block 372 includes a battery 373, e.g., a rechargeable battery, and the accompanying circuit to condition the power for use by the processor 354. The second processor 354 is also coupled to the outputs including electrical stimulation output $357_1$, vibrate stimulation output $357_2$, and audible stimulation output $357_3$. The audible stimulation or feedback is generated by closing a first switch establishing a first circuit between i) a positive terminal of an electrical reservoir (e.g., the battery 373), ii) through an audible stimulation output, and iii) to a negative terminal of the electrical reservoir. The tactile stimulation or feedback is generated by closing a second switch establishing a second circuit between i) the positive terminal of the electrical reservoir, ii) through a motor with eccentricity, and iii) to the negative terminal of the electrical reservoir. The electrical stimulation or feedback is generated by closing a third switch establishing a third circuit between i) the positive terminal of the electrical reservoir, ii) through two inwardly facing electrodes when the collar system is placed on an animal, and iii) to the negative terminal of the electrical reservoir.

As discussed above, the wireless channel shown between the handheld system 300A and the smart collar system 300B, can be any combination of wireless, and wired communication with protocols for which as discussed above.

Figure 4:
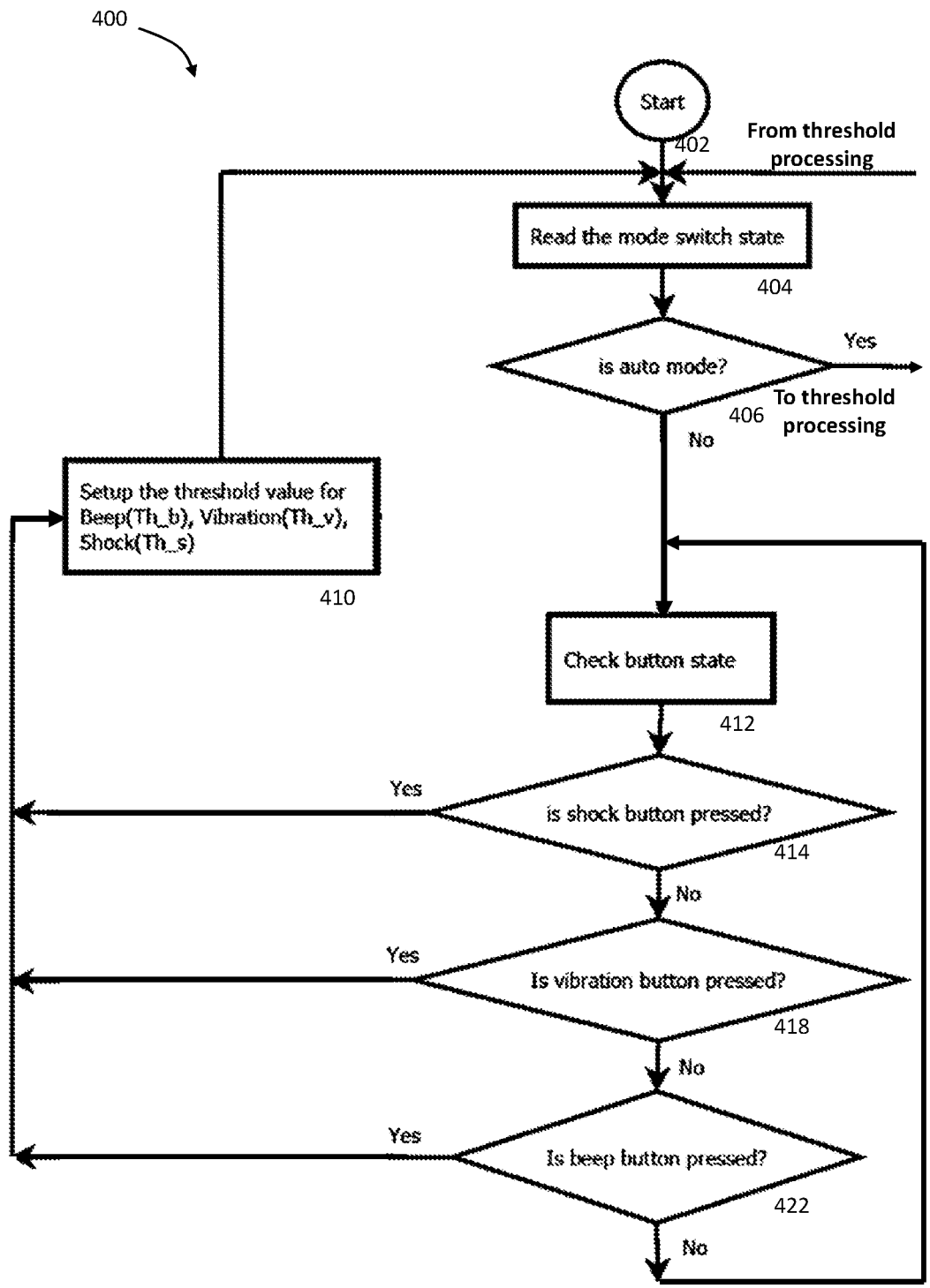
FIG. 4 is a flowchart of operation of the SLS of FIG. 1A, providing two modes of operation including a training mode and an automatic mode.
Figure 4:
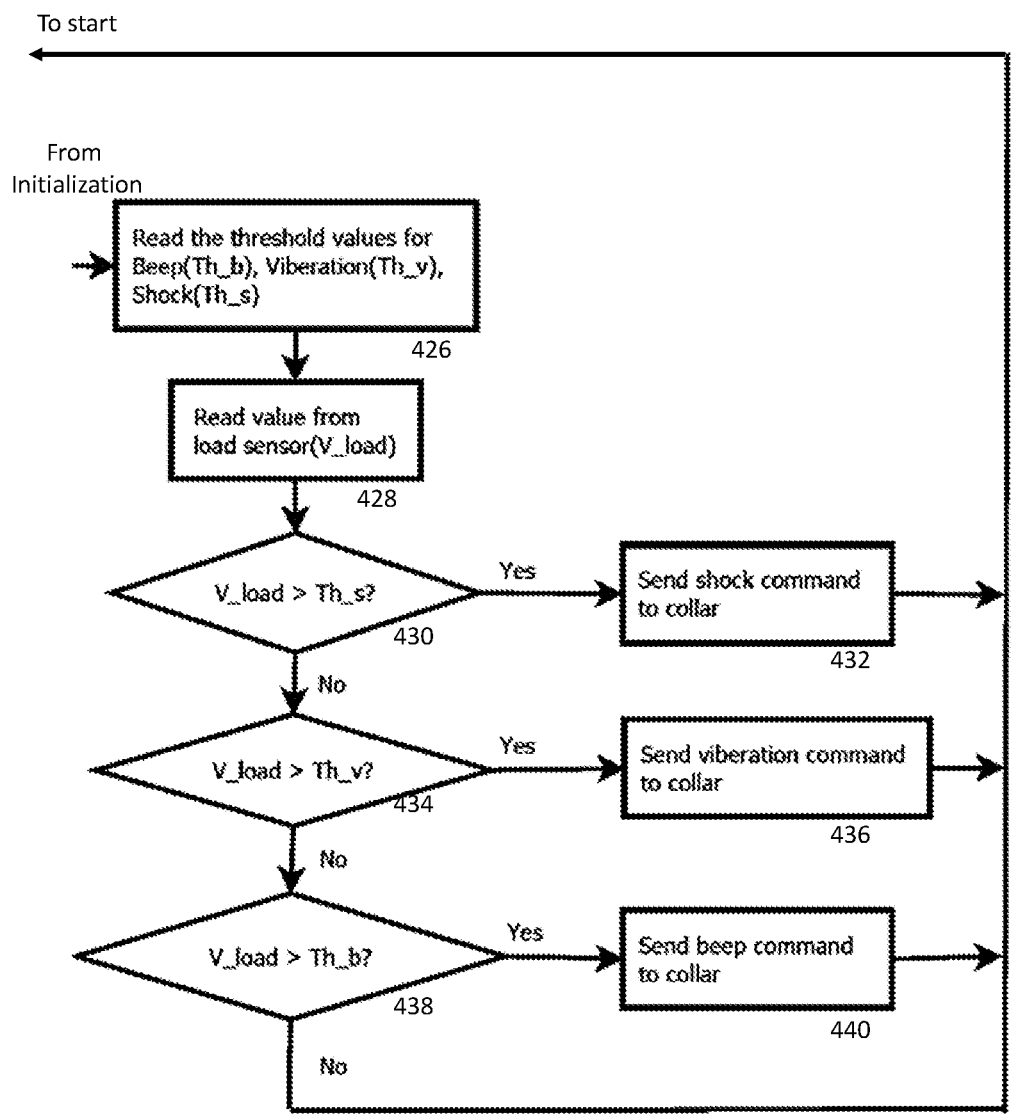

The two processors 304 and 354 are adapted to execute software encoded on respective non-transitory computer readable mediums. A flowchart is shown in FIG. 4 distributed over two pages which shows a process 400 carried out by the two processors 304 and 354 under the control of said software. The process 400 begins at the block 402, from which it proceeds to receiving an input at block 404 from the auxiliary manual input 302 (see FIG. 3). That input provides the software the knowledge as to whether smart leash system 300 is in a training mode or in an automatic mode, as shown in the decision block 406. If the setting on the auxiliary input places the smart leash system 300 in training mode the process 400 proceeds to checking the status of the three manual inputs as provided in block 412. Otherwise, if the process 400 determines the smart leash system 300 is in the automatic mode, the process 400 proceeds to the block 426, as described more fully below.

In training mode, the process 400 checks to determine which of the three manual inputs is pressed. For example, if the manual electrical stimulation input 3061 is pressed, then the process records the force registered from the tension load sensor 308 and stores the force as the threshold for electrical stimulation (Th_s). To do this, the user may simply attach the smart collar system 300B to a fixed point, e.g., a hook on a wall, and apply a force that the user finds appropriate for application of electrical stimulation. Similarly, if the manual vibration stimulation input 3062 is pressed, then the process records the force registered from the tension load sensor 308 and stores the force as the threshold for vibration stimulation (Th_v). To do this the user may simply attach the smart collar system 300B to a fixed point, e.g., a hook on a wall, and apply a force that the user finds appropriate for application of vibration stimulation. Alternatively, if the manual audible stimulation input 3063 is pressed, then the process records the force registered from the tension load sensor 308 and stores the force as the threshold for audible stimulation (Th_b). To do this, the user may simply attach the smart collar system 300B to a fixed point, e.g., a hook on a wall, and apply a force that the user finds appropriate for application of audible stimulation. It should be apparent that Th_b<Th_v<Th_s. For example, Th_b=1 lbf; Th_v=2 lbf; and Th_s=3 lbf. According to one embodiment, in order to avoid overlap between neighboring threshold, each higher threshold must be at least between about 1.1 to 1.5 higher than the previous threshold. In other words, 1.1*Th_b<Min (Th_v)<1.5*Th_b. Therefore, in the above example, the minimum value for Th_v is between 1.1 lbf and 1.5 lbf. In the above example, the Th_v was chosen as 2 lbf which is significantly higher than 1.5 lbf.

Coming out the block 412, the decision blocks 414, 418, and 422 each determine whether the electrical stimulation input is pressed (i.e., decision block 414); the vibration stimulation input is pressed (i.e., decision block 418); or the audible stimulation input is pressed (i.e., decision block 422). If none of the buttons are pushed, then the output of the decision block 422 traverses back to the block 412. The thresholds are set in the block 410. For example, if the electrical stimulation input is pressed, then the electrical stimulation threshold, i.e., the shock stimulation (Th_s), is set in block 410. If the vibration stimulation input is pressed, then the vibration stimulation threshold (Th_v) is set in block 410. If the audible stimulation input is pressed, then the audible stimulation threshold (Th_b) is set in block 410. The output of the block 410 traverses to the block 404 to repeat the process for determining whether in automatic or manual/training mode.

If at the decision block 406 it is determined that the smart leash system 300 is in the automatic mode, then as discussed above, the process 400 proceeds to the block 426. In this block the process first determine values for the three thresholds. The process then reads force value (V_load) from the tension load sensor 308. V_load is compared to the three threshold (Th_s in the decision block 430; Th_v in the decision block 434; and Th_b in the decision block 438). If the test associated with each of these decision blocks is positive, that test results in activation of the corresponding stimulation. For example, if the test of V-load>Th-s, then process 400 activates the electrical stimulation output $357_1$ in block 432. If the test of V-load>Th-v, then process 400 activates the vibration stimulation output $357_2$ in block 436. If the test of V-load>Th-b, then process 400 activates the audible stimulation output $357_3$ in block 440. If answer to each of the decision blocks 430 and 434 is negative, the process 400 proceeds to the next decision block. If, however, the answer to the decision block 438 is negative, the process 400 proceeds back to the start block 402. In addition, after setting any of the stimulation outputs (i.e., $357_1$, $357_2$, or $357_3$), the process 400 also returns to the start block 402.

The various threshold settings are thus selectable according to the amount of force that tension load sensor 308 registers and at which point the various stimulation inputs are pressed. While not shown, the period of time for stimulation may be selectable or fixed. For example, the period of time for stimulation (electrical, vibration, or audible) may be determined by how long the trainer holds the associated input pin. That is, an internal counter registers stimulation period for each type of stimulation, and not only holds in memory the threshold for that stimulation, but also the amount of time that the stimulation should persist. Alternatively, according to another embodiment, the stimulation period may be fixed for each type of stimulation. For example, the electrical stimulation may require T_s while vibration and audible may require T_v and T_b, respectively. These fixed periods may be different. For example T_b>T_v>T_s or they may all be the same, or two may be the same and different that the other, e.g., T_b=T_v>T_s.

According to another embodiment, for each type of stimulation, there may be stimulations at different levels associated with different force levels. For example, suppose the threshold for vibrate stimulation is set at 2 lbf. And further suppose the threshold for electrical stimulation is set for 3 lbf. According to one embodiment, the level of vibration may be adjustable, e.g., according to a linear curve between 2 lbf and 3 lbf. For example, initially after crossing 2 lbf, the vibrate stimulation may have a peak-to-peak amplitude of V1 with a frequency of f1, however, at 2.9 lbf the vibrate stimulation may be at a peak-to-peak amplitude of V2 and a frequency of f2. The progress from V1 to V2 and f1 to f2 may be based on a linear curve, or a non-linear curve, e.g., a second order relationship vs. force registered. According to one embodiment, progress from V1 to V2 may be independent from progress from f1 to f2. In other words, at 2 lbf the vibration stimulation may be at a peak-to-peak amplitude of V1 and f1, while at 2.9 lbf, the vibration may be at a peak-to-peak amplitude of V2 but still at a frequency of f1. Such variations may be programmable (not shown) by utilizing the existing manual inputs, or by employing additional inputs.

According to another embodiment, the handheld system 300A may include a screen that provides various readouts, such as the registered force, or other information about the training mode or the automatic mode. Alternatively, the handheld system 300 may be configured to provide such information on to a smart device, e.g., a smart cellular phone, a smart watch, a tablet, or other smart devices that can be carried by a walker. Whether on the handheld system 300 or on an associated smart device, the threshold can also be set up strictly electronically by traversing through a menu system that allows the user to program each threshold without apply a force. In this embodiment, the threshold values only (i.e., Th_s, Th-v, Th_b) can be set up without actual exertion of force; or alternatively other parameters such peak-to-peak amplitude and frequency and a mathematical function that governs progress of the peak-to-peak amplitude and/or frequency between the threshold values can also be set up electronically.

As discussed above, the location of the tension load sensor 308 can be on handheld system 300A, on the smart collar system 300B, or on the smart leash 106. Placement of the sensor on the handheld system 300A or 300B removes the necessity to remotely powering the sensor.

The handheld system 300A or the smart collar system 300B or both may be equipped with a swivel mechanism to allow angular articulation of the leash. Such articulation allows for the force to be registered in a normal fashion with respect to the leash. In other words, since force is a vector quantity, it includes an amplitude and a direction. If the direction of the vector is not normal with respect to the force sensor, it may register an incorrect value since a component of the direction is perpendicular to the axial direction of the sensor.

Alternative and while note shown, according to one embodiment of the present disclosure, the sensor may be adapted to provide forces in X and Y directions according to a Cartesian system. Such a system would allow setting thresholds, as discussed above, not only for a single direction but also for two perpendicular directions (i.e., X and Y). Such a system would allow the user to not only apply a corrective feedback when the force exceeds a threshold in the X direction but also provide additional feedback when the force exceeds in the Y-direction. This allows the walker to monitor and train an animal in walking or running in a substantially straight line.

While not shown, according to one embodiment of the present disclosure, the force sensor may be replaced or work in conjunction with one or more accelerometers mounted on the smart collar system 300B. The accelerometer will not only provide force information, they can provide acceleration in one or more directions. For example, if the leash is not at its full extension and the animal on the leash begins to accelerate above a threshold set in a similar manner as discussed above for setting thresholds for force, then the smart leash system 300 may be able to provide a feedback to the animal prior to the full extension of the leash at which point force begins to register on the tension load sensor 308. The accelerometer(s) may be adapted to provide acceleration according to a Cartesian coordinate system, not only in the X and Y directions but also in the Z direction. Such a system would enable a user to limit the activity of the animal on leash with respect to up-and-down jumping as well as accelerating in an X-Y plane.

While a smart collar 300B is shown in the figures of the present disclosure, it should be appreciated that a harness can also be implemented in place of the collar or in addition thereto. The harness typically is placed around the chest of the animal. Such a harness advantageously provides additional locations for providing stimulation besides the neck area of the animal. For example, stimulation can be provided in multiple locations about the chest of the animal, e.g., on either side of the chest, further enhancing the feedback.

While not shown, according to one embodiment of the present disclosure, the collar can be equipped with a global positioning system sensor (GPS) that provides location of the animal with respect to the walker, whose handheld system may also be equipped with such a sensor. These sensors may provide relative distance between the walker and the animal on leash. The distance information can also be used to set up thresholds similar to the thresholds described above for the force. Thus when the stimulation can be governed by distance of the animal on leash from the walker. A first threshold is associated with a first distance, a second threshold with a second distance, and so on.

While not shown, according to one embodiment of the present disclosure, the handheld system 300A can be replaced by a belt attached to the waist of the animal. This arrangement is particularly helpful for runners who require their arms to be free. Similar to the discussion above, the waist-worn belt can be in wireless communication with a handheld smart device such as a smart watch to provide information regarding force, acceleration, etc.

While not shown, according to one embodiment of the present disclosure, the smart collar system 300B may be equipped with various health monitoring devices such as temperature measurement, blood oxygen saturation, pulse meter, humidity sensor, etc., in order to provide information about the health of the animal on leash to the owner. Similar to the threshold setting for force, each of these health monitoring devices can be associated with a corresponding set of thresholds to alert the walker of the health of the animal. For example, if the animal's temperature rises above a first threshold, the smart leash system may be configured to alert the user with for example a feedback signal (audible, or vibration) that the first threshold has been reached.

Also, while not shown, according to one embodiment of the present disclosure, a second set of feedback can be provided to the user to alert the user animal feedback has indeed been deployed. For example, a vibration sensor may be implemented near the source of vibration on the smart collar 300B to provide feedback to the walker that the vibration feedback has been delivered. Another example may be a microphone near the source of audible sound feedback that receives the audible feedback and provides feedback to the walker that the audible feedback has been delivered to the animal on leash.

While the smart collar discussed herein has additional functionality above and beyond a typical collar, it should be appreciated that a number of collar arrangements are within the scope of the present disclosure. These include choker collars, spike collars, pincher collar, and retractable collar/leash combinations.

Those having ordinary skill in the art will recognize that numerous modifications can be made to the specific implementations described above. The implementations should not be limited to the particular limitations described. Other implementations may be possible.

The invention claimed is:

1. A smart leash system, comprising:
a handheld system configured to be held by a user;
a collar system configured to be worn by an animal;
a leash coupled to and extended between the handheld system and the collar system; and
a load measuring sensor coupled to the handheld system and configured to measure force applied to the leash, wherein one of the handheld system, the collar system, and both the handheld system and the collar system is configured to receive a force signal representing the force applied to the leash and signal the collar system and to provide a feedback to the animal when the force signal exceeds a predetermined threshold,
the handheld system further comprising a handheld processor;
a communication link between the handheld system and the collar system by which the handheld system communicates with the collar system,
the handheld processor having software encoded on a first non-transitory computer readable medium configured to:
compare the force signal to a first predetermined threshold and if the force signal exceeds the first predetermined threshold, communicate a first signal to the collar system;
the collar system further comprising a collar processor, the collar processor having software encoded on a second non-transitory computer readable medium configured to:
receive the first signal and in response thereto provide a first feedback.

2. The smart leash system of claim 1, wherein the first predetermined threshold is pre-programmed or setup in a training mode.

3. The smart leash system of claim 2, wherein the first feedback is an audible feedback, where the audible feedback is generated by closing a first switch establishing a first circuit between i) a positive terminal of an electrical reservoir, ii) through an audible stimulation output, and iii) to a negative terminal of the electrical reservoir.

4. The smart leash system of claim 3,
the handheld processor software further configured to:
compare the force signal to a second predetermined threshold and if the force signal exceeds the second predetermined threshold, communicate a second signal to the collar system; and
the collar processor software further configured to:
receive the second signal and in response thereto provide a second feedback.

5. The smart leash system of claim 4, wherein the second predetermined threshold is pre-programmed or setup during the training mode.

6. The smart leash system of claim 5, wherein the second feedback is a tactile feedback, where the tactile feedback is generated by closing a second switch establishing a second circuit between i) the positive terminal of the electrical reservoir, ii) through a motor with eccentricity, and iii) to the negative terminal of the electrical reservoir.

7. The smart leash system of claim 6,
the handheld processor software further configured to:
compare the force signal to a third predetermined threshold and if the force signal exceeds the third predetermined threshold, communicate a third signal to the collar system; and
the collar processor software further configured to:
receive the third signal and in response thereto provide a third feedback.

8. The smart leash system of claim 7, wherein the third predetermined threshold is pre-programmed or setup during the training mode.

9. The smart leash system of claim 8, wherein the third feedback is an electrical feedback, where the electrical feedback is generated by closing a third switch establishing a third circuit between i) the positive terminal of the electrical reservoir, ii) through two inwardly facing electrodes when the collar system is placed on an animal, and iii) to the negative terminal of the electrical reservoir.

10. A method of providing training feedback to an animal, comprising:
placing a smart leash system (SLS) on an animal, the SLS including a collar system configured to be worn by an animal, a leash, a handheld system held by a user, and a load measuring sensor coupled to the handheld system and adapted to provide a force signal proportional to a force placed on the leash;
receiving the force signal by one of the handheld system, the collar system, and both the handheld system and the collar system, the signal representing a force applied to the leash;
providing a feedback to the animal when the signal representing the force exceeds a predetermined threshold;
establishing a communication link between the handheld system and the and the collar system,
the handheld system comparing the force signal to a first predetermined threshold;
if the force signal exceeds the first predetermined threshold, communicating a first signal to the collar system via the established communication link; and
the collar system receiving the first signal and in response thereto providing a first feedback.

11. The method of claim 10, wherein the first predetermined threshold is pre-programmed or setup in a training mode.

12. The method of claim 11, wherein the first feedback is an audible feedback, where the audible feedback is generated by closing a first switch establishing a first circuit between i) a positive terminal of an electrical reservoir, ii) through an audible stimulation output, and iii) to a negative terminal of the electrical reservoir.

13. The method of claim 12,
the handheld system comparing the force signal to a second predetermined threshold;
if the signal exceeds the second predetermined threshold, communicating a second signal to the collar system; and
the collar system receiving the second signal and in response thereto providing a second feedback.

14. The method of claim 13, wherein the second predetermined threshold is pre-programmed or setup during the training mode.

15. The method of claim 14, wherein the second feedback is a tactile feedback, where the tactile feedback is generated by closing a second switch establishing a second circuit between i) the positive terminal of the electrical reservoir, ii) through a motor with eccentricity, and iii) to the negative terminal of the electrical reservoir.

16. The smart leash system of claim 15,
the handheld system comparing the force signal to a third predetermined threshold;

if the force signal exceeds the third predetermined threshold, communicating a third signal to the collar system; and the collar system receiving the third signal and in response thereto provide a third feedback.

17. The method of claim 16, wherein the third predetermined threshold is pre-programmed or setup during the training mode.

18. The method of claim 17, wherein the third feedback is an electrical feedback, where the electrical feedback is generated by closing a third switch establishing a third circuit between i) the positive terminal of the electrical reservoir, ii) through two inwardly facing electrodes when the collar system is placed on an animal, and iii) to the negative terminal of the electrical reservoir.

* * * * *